United States Patent [19]
Aoki et al.

[11] Patent Number: 5,467,594
[45] Date of Patent: Nov. 21, 1995

[54] EXHAUST GAS-PURIFYING SYSTEM FOR INTERNAL COMBUSTION ENGINES

[75] Inventors: Takuya Aoki; Yuichi Shimasaki; Seiji Matsumoto; Seiji Hatcho; Toshikazu Oketani; Yukio Miyashita; Akihisa Saito; Takashi Komatsuda; Hiroaki Kato, all of Wako, Japan

[73] Assignee: Honda Giken Kogyo Kabushiki Kaisha, Tokyo, Japan

[21] Appl. No.: 280,559

[22] Filed: Jul. 26, 1994

[30] Foreign Application Priority Data

Jul. 27, 1993 [JP] Japan .................... 5-185256

[51] Int. Cl.⁶ .................................................. F01N 3/28
[52] U.S. Cl. ............................. 60/276; 60/284; 60/297; 60/311
[58] Field of Search ........................... 60/274, 297, 311, 60/276, 284

[56] References Cited

U.S. PATENT DOCUMENTS 5,125,231  6/1992  Patil ............................................ 60/297
5,388,405  2/1995  Fujishita ..................................... 60/297

FOREIGN PATENT DOCUMENTS 4-105925  9/1992  Japan .

*Primary Examiner*—Douglas Hart
*Attorney, Agent, or Firm*—Nikaido, Marmelstein, Murray & Oram

[57] ABSTRACT

An exhaust gas-purifying system for an internal combustion engine is provided with hydrocarbon-adsorbing catalyzer for adsorbing unburnt gas components present in exhaust gases. At least one exhaust gas-purifying catalyzer is arranged in the exhaust passage at a location downstream of the hydrocarbon-adsorbing catalyzer. A bypass passage bypasses the hydrocarbon-purifying catalyzer. A changeover valve is arranged in the exhaust passage at a branchpoint between the bypass passage and the exhaust passage, for selecting a first flow path in which exhaust gases are guided to the unburnt gas component-adsorbing catalyzer, or a second flow path in which exhaust gases are guided through the bypass passage. First and second exhaust gas concentration sensors are arranged in the exhaust passage at locations upstream and downstream of the hydrocarbon-purifying catalyzer. An ECU controls the changeover valve to select the first flow path or the second flow path, based on outputs from the first and second exhaust gas concentration sensors.

10 Claims, 3 Drawing Sheets

EXHAUST GAS-PURIFYING SYSTEM FOR INTERNAL COMBUSTION ENGINES

BACKGROUND OF THE INVENTION

1. Field of the Invention

This invention relates to an exhaust gas-purifying system for internal combustion engines, which has unburnt gas component-adsorbing means arranged in the exhaust passage of the engine, for adsorbing unburnt gas components present in exhaust gases.

2. Prior Art

When an internal combustion engine is started, especially in a cold state, an exhaust gas-purifying catalyzer of the engine is not yet activated, so that unburnt gas components present in exhaust gases are unfavorably emitted into the air. To prevent emission of unburnt gases into the air, there has been proposed an exhaust gas-purifying system for internal combustion engines, by Japanese Provisional Utility Model Publication (Kokai) No. 4-105925, which includes unburnt gas component-adsorbing means arranged in the exhaust passage of the engine, for adsorbing unburnt gas components.

The above proposed exhaust gas-purifying system includes a bypass passage bypassing the unburnt gas component-adsorbing means, and a changeover valve for selectively guiding exhaust gases to the unburnt gas component-adsorbing means or through the bypass passage. The changeover valve is controlled such that before the temperature of the unburnt gas component-adsorbing means rises up to a predetermined value, exhaust gases are guided to the unburnt gas component-adsorbing means, whereby unburnt gas components in the exhaust gases are adsorbed by the exhaust gas component-adsorbing means, whereas after the temperature of the unburnt gas component-adsorbing means has reached the predetermined value, exhaust gases are guided through the bypass passage, to thereby prevent the unburnt gas components from being purged from the unburnt gas component-adsorbing means.

However, since the proposed exhaust gas-purifying system thus determines the adsorbed state of unburnt gas components, based on the temperature of the unburnt gas component-adsorbing means, the accuracy of determination of the adsorbed state of unburnt gas components is not always sufficient. As a result, even when the unburnt gas component-adsorbing means still has capacity for adsorbing the unburnt gas components, the bypass passage is unfavorably opened, so that unburnt gas components are guided to pass through the exhaust gas-purifying catalyzer, which has not been activated yet, and then emitted into the air. On the other hand, even when the unburnt gas component-adsorbing means is fully charged with unburnt gas components and hence purging of unburnt gas components is started, the bypass passage is not opened, so that the purged unburnt gas components are emitted into the air.

SUMMARY OF THE INVENTION

It is the object of the invention to provide an exhaust gas-purifying system for internal combustion engines, which is capable of preventing unburnt gas components from being emitted into the air by accurately determining the adsorbed state of the unburnt gas components by the unburnt gas component-adsorbing means.

To attain the above object, the present invention provides an exhaust gas-purifying system for an internal combustion engine having an exhaust passage, comprising:

unburnt gas component-adsorbing means arranged in the exhaust passage of the engine, for adsorbing unburnt gas components present in exhaust gases emitted from the engine;

at least one exhaust gas-purifying catalyzer arranged in the exhaust passage at a location downstream of the unburnt gas component-purifying means, for purifying exhaust gases;

a bypass passage bypassing the unburnt gas component-purifying means, the bypass passage having an upstream end thereof connected to the exhaust passage to form a branchpoint together therewith;

a changeover valve arranged in the exhaust passage at the branchpoint, for selecting a first flow path in which exhaust gases are guided to the unburnt gas component-adsorbing means, or a second flow path in which exhaust gases are guided through the bypass passage;

first exhaust gas concentration sensor means arranged in the exhaust passage at a location upstream of the unburnt gas component-adsorbing means;

second exhaust gas concentration sensor means arranged in the exhaust passage at a location downstream of the unburnt gas component-adsorbing means; and control means for controlling the changeover valve to select the first flow path or the second flow path, based on outputs from the first and second exhaust gas concentration sensor means.

Preferably, the control means controls the changeover valve such that the second flow path is selected when a difference between the output from the first exhaust gas concentration sensor means and the output from the second exhaust gas concentration sensor means exceeds a predetermined value.

In a preferred embodiment of the invention, the unburnt gas component-adsorbing means adsorbs hydrocarbons present in the exhaust gases from the engine.

In the preferred embodiment, the first and second exhaust gas concentration sensor means detect concentration of hydrocarbons in the exhaust gases.

Alternatively, the first and second exhaust gas concentration sensor means may detect concentration of oxygen in the exhaust gases.

To attain the object, the invention further provides an exhaust gas-purifying system for an internal combustion engine having an exhaust passage, comprising:

unburnt gas component-adsorbing means arranged in the exhaust passage of the engine, for adsorbing unburnt gas components present in exhaust gases emitted from the engine;

at least one exhaust gas-purifying catalyzer arranged in the exhaust passage at a location downstream of the unburnt gas component-purifying means, for purifying exhaust gases;

a bypass passage bypassing the unburnt gas component-purifying means, the bypass passage having an upstream end thereof connected to the exhaust passage to form a branchpoint together therewith;

a changeover valve arranged in the exhaust passage at the branchpoint, for selecting a first flow path in which exhaust gases are guided to the unburnt gas component-adsorbing means, or a second flow path in which exhaust gases are guided through the bypass passage;

exhaust gas concentration sensor means arranged in the exhaust passage at a location upstream of the unburnt gas component-adsorbing means; and control means for controlling the changeover valve to select the first flow path or the second flow path, based on an output from the exhaust gas concentration sensor means.

Preferably, the control means controls the changeover valve such that the second flow path is selected when the output from the exhaust gas concentration sensor means exceeds a predetermined value.

In a preferred embodiment of the invention, the unburnt gas component-adsorbing means adsorbs hydrocarbons present in the exhaust gases from the engine.

In the preferred embodiment, the exhaust gas concentration sensor means detects concentration of hydrocarbons in the exhaust gases.

Alternatively, the exhaust gas concentration sensor means may detect concentration of oxygen in the exhaust gases.

The above and other objects, features, and advantages of the invention will be more apparent from the following detailed description taken in conjunction with the accompanying drawings.

DETAILED DESCRIPTION

The invention will now be described in detail with reference to the drawings showing embodiments thereof.

Figure 1:
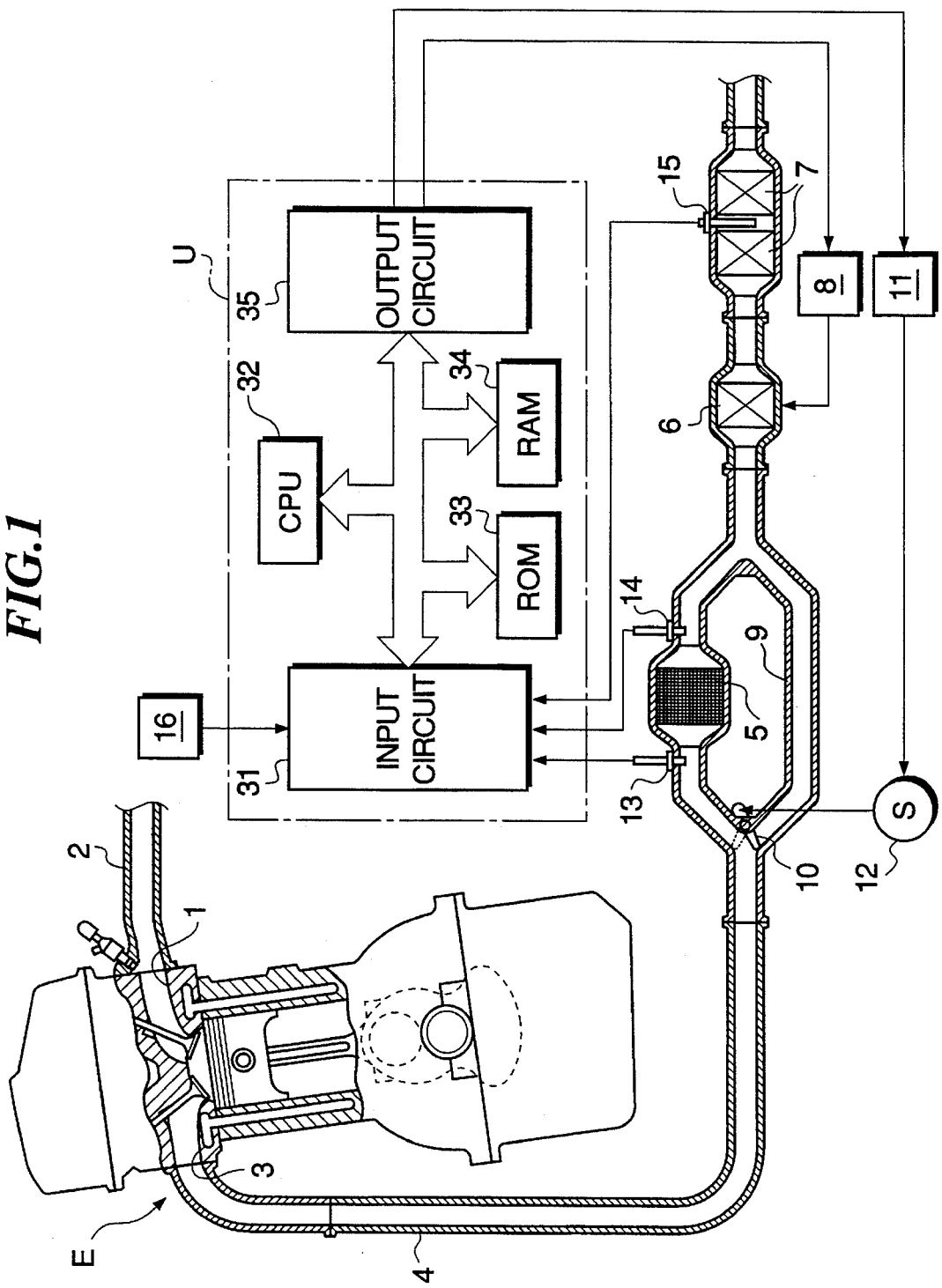
FIG. 1 is a block diagram schematically showing the whole arrangement of an internal combustion engine and an exhaust gas-purifying system therefor, according to a first embodiment of the invention.

Referring first to FIG. 1, there is illustrated the whole arrangement of an internal combustion engine E and an exhaust gas-purifying-system therefor, according to a first embodiment of the invention. The engine E has intake ports 1 and exhaust ports 3, to which are connected an intake passage 2 and an exhaust passage 4, respectively. The exhaust passage 4 is defined as a passage extending from the exhaust ports 3 and terminating at a terminal end thereof, through which exhaust gases are emitted into the air. The exhaust passage 4 is provided therein with a hydrocarbon-adsorbing catalyzer 5, for adsorbing hydrocarbons as unburnt exhaust gas components, an electrically heated catalyzer 6 arranged at a location downstream of the catalyzer 5, and a main catalyzer 7 arranged at a location downstream of the catalyzer 6. The catalyzers 6, 7 purify exhaust gases such as HC, CO and NOx.

The electrically heated catalyzer 6 has a heater, not shown, disposed around the catalyzer 6. The catalyzer 6 is heated by electric current applied thereto via a heater driver 8. Alternatively, the electrically heated catalyzer 6 may have a catalyst carrier formed of a material with electric resistance which generates heat by current applied thereto. The main catalyzer 7 has larger capacity than the electrically heated catalyzer 6, which performs a major role in exhaust gas-purifying operation when the engine E has been warmed up.

A bypass passage 9 extends from the exhaust passage 4 in a fashion bypassing the hydrocarbon-adsorbing catalyzer 5, with an upstream end thereof connected to the exhaust passage 4 to form a branchpoint together therewith. Arranged in the exhaust passage 4 at the branchpoint or upstream end of the bypass passage 9 is a changeover valve 10 formed of a butterfly valve, which is driven by a solenoid 12 connected to a solenoid driver 11.

First and second hydrocarbon concentration sensor 13 and 14 are inserted into the exhaust passage 4 at upstream and downstream locations of the hydrocarbon catalyzer 5 for detecting the concentration of hydrocarbons in exhaust gases. A catalyst temperature sensor 15 is mounted in the main catalyzer 7 for detecting the temperature thereof.

The heater driver 8 and the solenoid driver 11 are electrically connected to an electronic control unit (hereinafter referred to as "the ECU") U to be controlled by driving signals therefrom. Also, the above sensors 13–15 are electrically connected to the ECU U for supplying respective output signals thereto.

The ECU U is comprised of an input circuit 31 which is supplied with output signals from the sensors 13–15, an ON/OFF signal from an ignition switch of the engine E, a central processing unit (hereinafter referred to as "the CPU") 32 for processing the output signals from the sensors 13, 14 and 15, based on a predetermined operational program, a ROM 33 storing various operational programs and data to be used for operations executed by the CPU 32, a RAM for temporarily storing the output signals from the sensors 13, 14 and 15 and results of calculations, and an output circuit 35 for supplying driving signals to the heater driver 8 and the solenoid driver 11.

Figure 2:
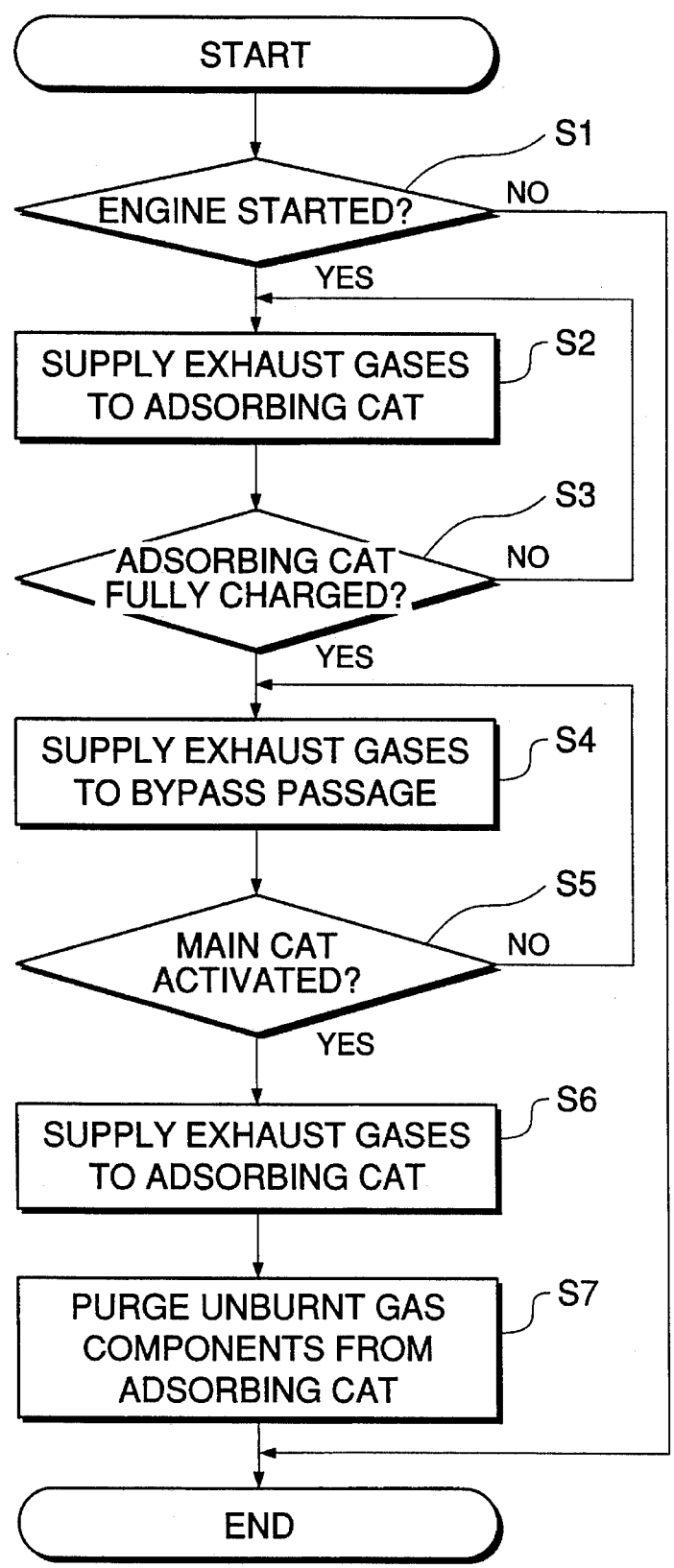
FIG. 2 is a flowchart showing a program for executing exhaust gas purification control according to the first embodiment.

Next, the operation of the exhaust gas-purifying system constructed as above according to the first embodiment will be described hereinbelow within reference to FIG. 2 showing a program for executing exhaust gas purification control executed by the CPU 32.

First, at a step S1 in FIG. 2, it is determined whether or not the engine E has been started, based on the ON/OFF signal from the ignition switch 16. Simultaneously with the start of the engine E, the electrically heated catalyzer 6 is supplied with electric current via the heater driver 8. If it is determined that the engine E has not been started, the program is immediately terminated, whereas if it is determined that the engine E has been started, a command is supplied to the solenoid driver 11 for bringing the changeover valve 10 into a position indicated by the solid line in FIG. 1 in which it closes the bypass passage 9. Immediately after the start of the engine E, however, the temperature of the electrically heated catalyzer 6 is not elevated to such a sufficient level that the catalyzer 6 cannot purify unburnt gas components present in exhaust gases. On this occasion, the changeover valve 10 is controlled into the position indicated by the solid line in FIG. 1, as mentioned above, and accordingly exhaust gases are supplied to the hydrocarbon-adsorbing catalyzer 5 so that hydrocarbons in the exhaust gases are adsorbed thereby. Therefore, even if the electrically heated catalyzer 6 and the main catalyzer 7 have not been activated yet, unburnt gas components can be prevented from being emitted into the air.

Then, at a step S3, it is determined whether or not the hydrocarbon-adsorbing catalyzer 5 has been fully charged with unburnt gas components.

The hydrocarbon-adsorbing catalyzer 5 supplied with exhaust gases is progressively charged with unburnt gas components. If the catalyzer 5 has been charged to its full capacity, the fully charged state of the hydrocarbon-adsorbing catalyzer 5 is detected at the step S3, based on outputs from the first hydrocarbon concentration sensor 13 and the second hydrocarbon concentration sensor 14. More specifically, when the hydrocarbon-adsorbing catalyzer 5 can afford to adsorb unburnt gas components, the output from the second hydrocarbon concentration sensor 14 is low. On the other hand, when the hydrocarbon-adsorbing catalyzer 5 is charged to its full capacity so that it can no more adsorb unburnt gas components, the output from the second hydrocarbon concentration sensor 14 increases to a value as high as the output from the first hydrocarbon concentration sensor 13. Further, when the temperature of the hydrocarbon-adsorbing catalyzer 5 is so elevated that purging of unburnt gas components starts to occur, the output from the second hydrocarbon concentration sensor 14 exceeds the output from the first hydrocarbon concentration sensor 13. In short, a difference between the output from the first hydrocarbon concentration sensor 13 and the output from the second hydrocarbon concentration sensor 14 exceeds a predetermined value, and then it is determined that the hydrocarbon-adsorbing catalyzer 5 is in the fully charged state.

After the hydrocarbon-adsorbing catalyzer 5 has been fully charged, at a step S4, a command is issued by the CPU 32 to the solenoid driver 11 to turn the changeover valve 10 into a position indicated by the broken line in FIG. 1, in which it opens the bypass passage 9 and closes the passage leading to the hydrocarbon-adsorbing catalyzer 5. More specifically, if exhaust gases are continuously supplied to the hydrocarbon-adsorbing catalyzer 5 even after the fully charged state thereof is reached, unburnt gas components are purged from the hydrocarbon-adsorbing catalyzer 5 and emitted into the air. Therefore, the electronic control unit U issues a command to the solenoid driver 11 to switch the changeover valve 10 into a position indicated by the broken line via the solenoid 12, whereby exhaust gases are supplied via the bypass passage 9 to the electrically heated catalyzer 6 and the main catalyzer 7. Unburnt gas components present in the exhaust gases guided through the bypass passage 9 are purified by the electrically heated catalyzer 6 which has then been heated by current, to thereby prevent unburnt gas components from being emitted into the air.

When activation of the main catalyzer 7 due to heat of exhaust gases is subsequently detected by the catalyst temperature sensor 15, the CPU 32 issues a command to the solenoid driver 11 for switching the changeover valve 10 into the position indicated by the solid line via the solenoid 12, to thereby again supply exhaust gases to the hydrocarbon-adsorbing catalyzer 5, at a step S6. Thus, the unburnt gas components adsorbed by the hydrocarbon-adsorbing catalyzer 5 are purged therefrom due to heat of exhaust gases, and the purged unburnt gas components are purified by the main catalyzer 7, at a step S7. In this way, the hydrocarbon-adsorbing catalyzer 5 restores into a state in which it can adsorb unburnt gas components at the next start of the engine in a cold state.

As described above, according to the first embodiment, a fully charged state of the hydrocarbon-adsorbing catalyzer 5 is detected based on the outputs from the first and second hydrocarbon concentration sensors 13 and 14 arranged upstream and downstream of the hydrocarbon-adsorbing catalyzer 5, respectively, which makes it possible to switch the changeover valve 10 at suitable timing, to thereby minimize emission of unburnt gas components into the air.

Figure 3:
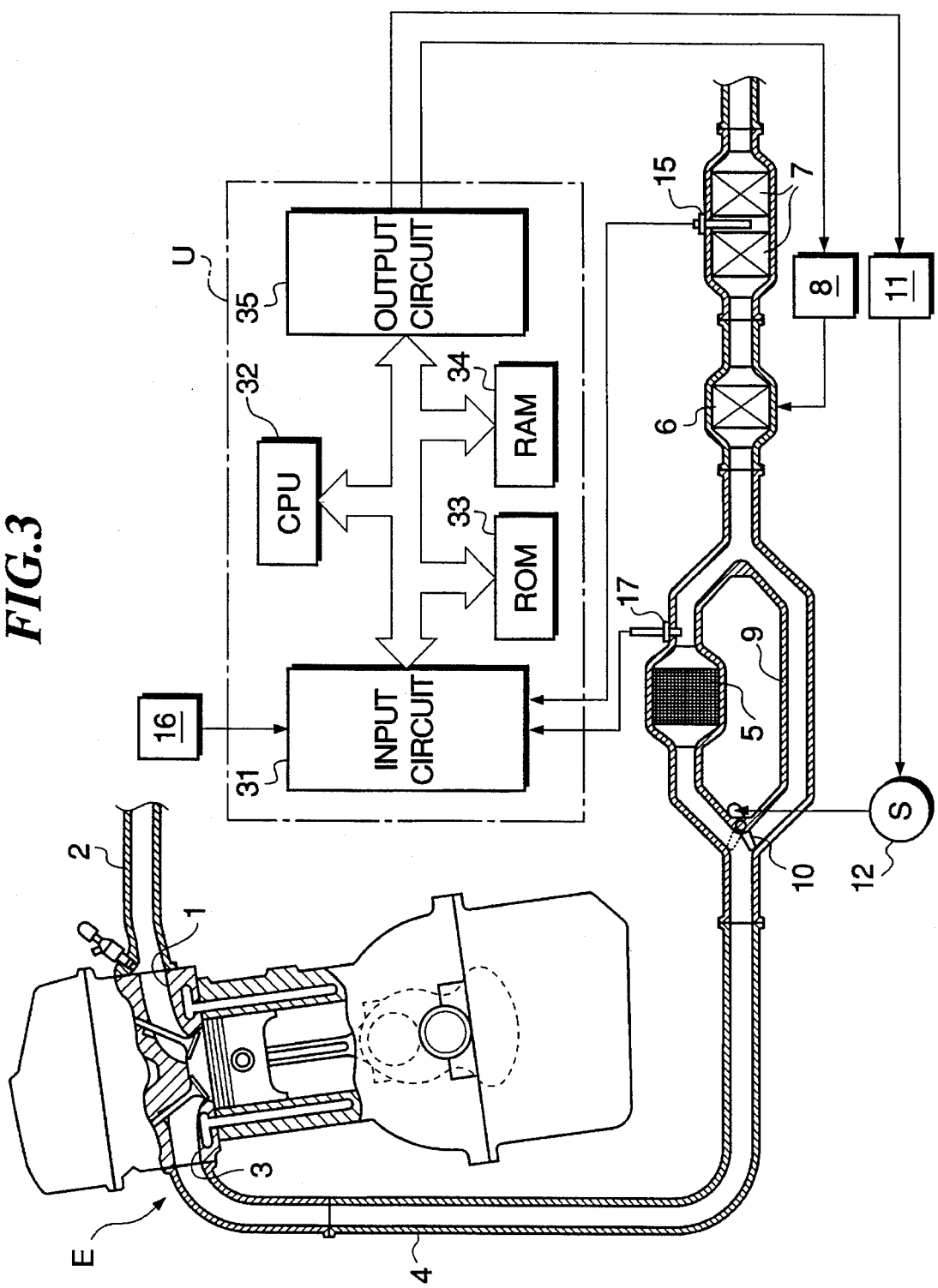
FIG. 3 is a block diagram schematically showing the whole arrangement of an internal combustion engine and an exhaust gas-purifying system therefor, according to a second embodiment of the invention.

FIG. 3 schematically shows the whole arrangement of an internal combustion engine and an exhaust gas-purifying system therefor, according to a second embodiment of the invention. This embodiment is distinguished from the first embodiment described above in that a single hydrocarbon concentration sensor 17 is provided, which is arranged at a location downstream of the hydrocarbon-adsorbing catalyzer 5, and a fully charged state of the hydrocarbon-adsorbing catalyzer 5 is detected from an output of the single hydrocarbon concentration sensor 17. Except for this, the exhaust gas-purifying system according to the present embodiment has substantially the same arrangement as that of the first embodiment.

According to the second embodiment, simultaneously upon the start of the engine E, the changeover valve 10 is controlled into a position indicated by the solid line in FIG. 3, so that exhaust gases are supplied to the hydrocarbon-adsorbing catalyzer 5 at the start of the engine E, whereby unburnt gas components present in the exhaust gases are adsorbed by the hydrocarbon-adsorbing catalyzer 5. Consequently, the output from hydrocarbon concentration sensor 17 is low. When the hydrocarbon-adsorbing catalyzer 5 is subsequently fully charged and hence its capacity for adsorbing unburnt gas components reaches a limit value thereof, unburnt gas components which have not been adsorbed pass through the hydrocarbon-adsorbing catalyzer 5. Then, the unburnt gas components from the catalyzer 5 is detected by the hydrocarbon concentration sensor 17, so that its output becomes higher. If the output from the sensor 17 exceeds a predetermined reference value, it is determined that the hydrocarbon-adsorbing catalyzer 5 is fully charged, and then the changeover valve 10 is switched into a position indicated by the broken line in FIG. 3, whereby exhaust gases are guided through the bypass passage 9.

In this way, according to the second embodiment as well, substantially the same purifying results as in the first embodiment can be obtained.

The embodiments described as above should not be construed to be limitative, but various modifications and variations thereto are possible insofar as they fall within the scope of the present invention.

For example, although the hydrocarbon concentration sensors 13, 14 and 17 are employed in the first and second embodiments as exhaust gas component concentration sensors, one or more oxygen concentration sensors may be employed, instead. This alternative example utilizes the fact that as unburnt gas components are adsorbed by the hydrocarbon-adsorbing catalyzer 5, the concentration of oxygen in exhaust gases at a location downstream of the catalyzer 5 increases, whereas as unburnt gas components are purged from the hydrocarbon-adsorbing catalyzer 5, the concentration of oxygen in exhaust gases at a location downstream of the catalyzer 5 decreases. Similarly to the first embodiment described above, a pair of oxygen concentration sensors may be arranged, respectively, upstream and downstream of the hydrocarbon-adsorbing catalyzer 5. Then, if the difference between an output from the upstream oxygen concentration sensor and an output from the downstream oxygen concentration sensor exceeds a predetermined value, the changeover valve 10 may be switched to open the bypass passage 9. Similarly to the second embodiment described above, a single oxygen concentration sensor may be arranged downstream of the hydrocarbon-adsorbing catalyzer 5. Then, if an output from the oxygen concentration sensor becomes lower than a predetermined value, the changeover valve 10 may be switched to open the bypass passage 9.

Further, although in the above described embodiments, the electrically heated catalyzer 6 and the main catalyzer 7 are provided as exhaust gas purifying catalyzers, the electrically heated catalyzer 6 is not essential to the invention and therefore may be omitted.

What is claimed is:

1. An exhaust gas-purifying system for an internal combustion engine having an exhaust passage, comprising:

unburnt gas component-adsorbing means arranged in said exhaust passage of said engine, for adsorbing unburnt gas components present in exhaust gases emitted from said engine;

at least one exhaust gas-purifying catalyzer arranged in said exhaust passage at a location downstream of said unburnt gas component-absorbing means, for purifying exhaust gases;

a bypass passage bypassing said unburnt gas component-absorbing means, said bypass passage having an upstream end thereof connected to said exhaust passage to form a branchpoint together therewith;

a changeover valve arranged in said exhaust passage at said branchpoint, for selecting a first flow path in which exhaust gases are guided to said unburnt gas component-adsorbing means, or a second flow path in which exhaust gases are guided through said bypass passage;

first exhaust gas concentration sensor means arranged in said exhaust passage at a location upstream of said unburnt gas component-adsorbing means;

second exhaust gas concentration sensor means arranged in said exhaust passage at a location downstream of said unburnt gas component-adsorbing means; and control means for controlling said changeover valve to select said first flow path or said second flow path, based on outputs from said first and second exhaust gas concentration sensor means.

2. An exhaust gas-purifying system as claimed in claim 1, wherein said control means controls said changeover valve such that said second flow path is selected when a difference between the output from said first exhaust gas concentration sensor means and the output from said second exhaust gas concentration sensor means exceeds a predetermined value.

3. An exhaust gas-purifying system as claimed in claim 1, wherein said unburnt gas component-adsorbing means adsorbs hydrocarbons present in the exhaust gases from said engine.

4. An exhaust gas-purifying system as claimed in any of claims 1, 2 or 3, wherein said first and second exhaust gas concentration sensor means detect concentration of hydrocarbons in the exhaust gases.

5. An exhaust gas-purifying system as claimed in any of claims 1, 2 or 3, wherein said first and second exhaust gas concentration sensor means detect concentration of oxygen in the exhaust gases.

6. An exhaust gas-purifying system for an internal combustion engine having an exhaust passage, comprising:

unburnt gas component-adsorbing means arranged in said exhaust passage of said engine, for adsorbing unburnt gas components present in exhaust gases emitted from said engine;

at least one exhaust gas-purifying catalyzer arranged in said exhaust passage at a location downstream of said unburnt gas component-absorbing means, for purifying exhaust gases;

a bypass passage bypassing said unburnt gas component-absorbing means, said bypass passage having an upstream end thereof connected to said exhaust passage to form a branchpoint together therewith;

a changeover valve arranged in said exhaust passage at said branchpoint, for selecting a first flow path in which exhaust gases are guided to said unburnt gas component-adsorbing means, or a second flow path in which exhaust gases are guided through said bypass passage;

exhaust gas concentration sensor means arranged in said exhaust passage at a location upstream of said unburnt gas component-adsorbing means; and control means for controlling said changeover valve to select said first flow path or said second flow path, based on an output from said exhaust gas concentration sensor means.

7. An exhaust gas-purifying system as claimed in claim 6, wherein said control means controls said changeover valve such that said second flow path is selected when the output from said exhaust gas concentration sensor means exceeds a predetermined value.

8. An exhaust gas-purifying system as claimed in claim 6, wherein said unburnt gas component-adsorbing means adsorbs hydrocarbons present in the exhaust gases from said engine.

9. An exhaust gas-purifying system as claimed in any of claims 6, 7 or 8, wherein said exhaust gas concentration sensor means detects concentration of hydrocarbons in the exhaust gases.

10. An exhaust gas-purifying system as claimed in any of claims 6, 7 or 8, wherein said exhaust gas concentration sensor means detects concentration of oxygen in the exhaust gases.

\* \* \* \* \*